United States Patent [19]

Yoshino et al.

[11] 4,246,840

[45] Jan. 27, 1981

[54] PRINTING MACHINE FOR PRINTING ON A THREE-DIMENSIONAL ARTICLE

[75] Inventors: Masaharu Yoshino; Michio Hirabayashi, both of Osaka, Japan

[73] Assignee: Izumi Denki Corporation, Osaka, Japan

[21] Appl. No.: 925,700

[22] Filed: Jul. 17, 1978

[30] Foreign Application Priority Data

| | | | |
|---|---|---|---|
| Jul. 15, 1977 | [JP] | Japan | 52-85335 |
| Dec. 29, 1977 | [JP] | Japan | 52-177508[U] |
| Jun. 9, 1978 | [JP] | Japan | 53-69975 |

[51] Int. Cl.[3] .......................... B41F 17/24; B41F 7/08; B65G 19/02

[52] U.S. Cl. .......................... 101/37; 101/217; 101/232; 198/735; 198/836

[58] Field of Search .......................... 101/35-44; 198/735, 836

[56] References Cited

U.S. PATENT DOCUMENTS

| | | | |
|---|---|---|---|
| 595,866 | 12/1897 | Sullivan | 53/131 |
| 1,079,339 | 11/1913 | Hennessey | 101/348 |
| 1,217,208 | 2/1917 | O'Brien | 101/42 |
| 2,279,858 | 4/1942 | Breitling | 101/99 |
| 2,326,850 | 8/1943 | Gladfelter | 101/40 |
| 2,945,436 | 7/1960 | Van Buskirk | 101/350 |
| 3,008,407 | 11/1961 | Roberts | 101/148 |
| 3,122,994 | 3/1964 | Crabtree | 101/35 |
| 3,285,169 | 11/1966 | Hartwig | 101/350 |
| 3,358,414 | 12/1967 | Hersh | 53/131 |
| 3,381,800 | 5/1968 | Everett | 198/735 |
| 3,595,164 | 7/1971 | Hovekamp | 101/37 |
| 3,874,497 | 4/1975 | Carlson | 198/836 |
| 4,140,056 | 2/1979 | Mabrouk | 101/350 |

FOREIGN PATENT DOCUMENTS

| | | | |
|---|---|---|---|
| 354952 | 8/1931 | United Kingdom | 101/348 |

*Primary Examiner*—Clyde I. Coughenour

*Attorney, Agent, or Firm*—Wenderoth, Lind & Ponack

[57] ABSTRACT

A printing machine suitable for printing on a three-dimensional article of small size includes an inking arrangement having a roller such as a blanket roller for printing a pattern directly on the article, a pair of rails parallel to each other for supporting thereon the article, a pair of guides extending above the rails for guiding the article therealong, a pushing member which is driven forward between the rails at the same speed as the peripheral surface speed of the blanket roller in synchronization with rotation of the blanket roller thereby forcing the article to slide forward on the rails to a printing position, and a controlling means for forcing an ink ductor into contact with a duct roller intermittently at fixed intervals. The printing machine further includes a mechanism for adjusting the position of the rails and the guides so that they correspond to the shape and the size of the article.

3 Claims, 18 Drawing Figures

76
75
170

4
164
73
72
170
74
9
8
7
170
6
67
66
68
69
70
71

PRINTING MACHINE FOR PRINTING ON A THREE-DIMENSIONAL ARTICLE

This invention relates to printing machine for printing on three-dimensional articles of small size such as electric parts and machine parts.

In a conventional printing machine for printing on three-dimensional and small-sized articles, the articles are conveyed to a predetermined printing position by means of attachments or claws fixed onto a chain conveyor at constant intervals. Such a prior art printing machine has a disadvantage in that when it is desired to change the shape and size of the articles to be printed, the attachments must be exchanged so as to accommodate the new articles. This operation is in many cases usually very laborious and requires much time since the attachments include a variety of parts which are incorporated into the printing machine in a complicated way.

A further disadvantage of the prior art printing machine is that it is practically very difficult to apply a very small and adequate amount of printing ink to a plate cylinder. As readily understood, a small plate is mounted on a plate cylinder in most cases in printing on three-dimensional articles of small size. Particularly, it is also difficult to control the amount of a color ink applied to the plate cylinder independently from the other color inks in multicolor printing.

A principal object of the present invention is to provide an improved printing machine for printing relatively small and minute prints on three-dimensional articles which are made of a material having no ink-absorbing ability.

Another object of the present invention is to provide an improved printing machine for effectively inking in relatively small and minute prints on a three-dimensional article made of a material having no ink-absorbing ability.

A further object of the present invention is to provide an improved printing machine for making clear and sharp prints on a three-dimensional article with a small amount of ink.

A still further object of the present invention is to provide an improved printing machine for printing on a three-dimensional article by a simplified process without the employment of attachments, jigs, supports, but rather with the employment of independently adjustable guide means permitting proper registry of the printing at each station during the transport of the article.

Other objects and features of the invention will be apparent from the following description taken with reference to the accompanying drawings, in which.

Figures 4, 16:
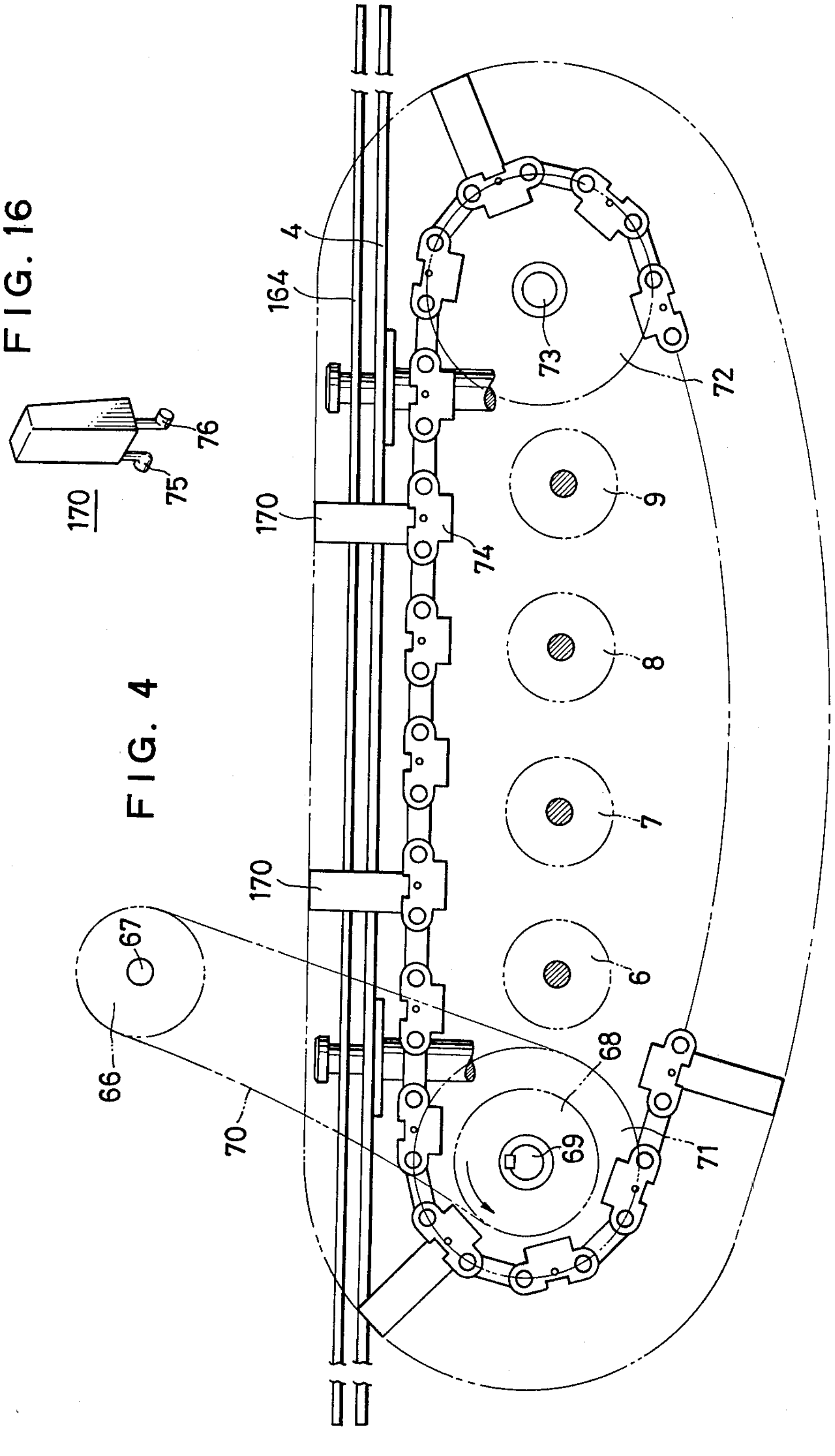
FIG. 4 is a front view of the article conveying means of the printing machine of the invention.
Figure 10:
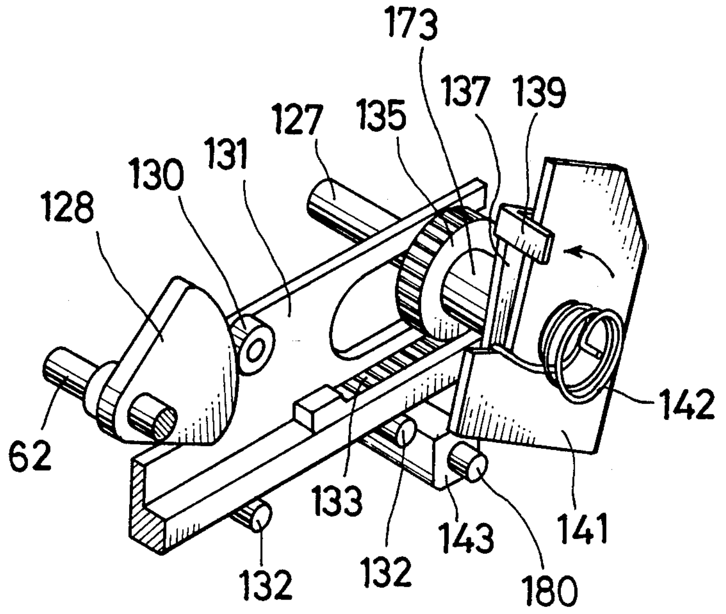
FIG. 10 is a perspective view of an embodiment of the eccentric ink ductor shaft driving means of the invention.
Figure 11:
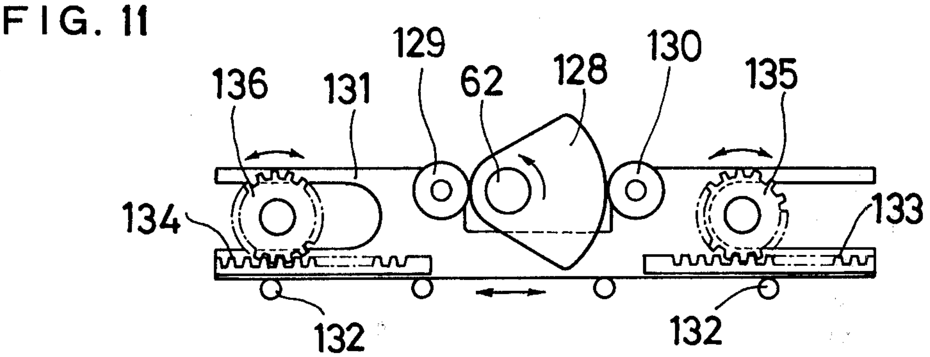
FIGS. 11 and 12 are schematic illustrations of the eccentric ink ductor shaft driving means shown in FIG. 10.
Figure 12:
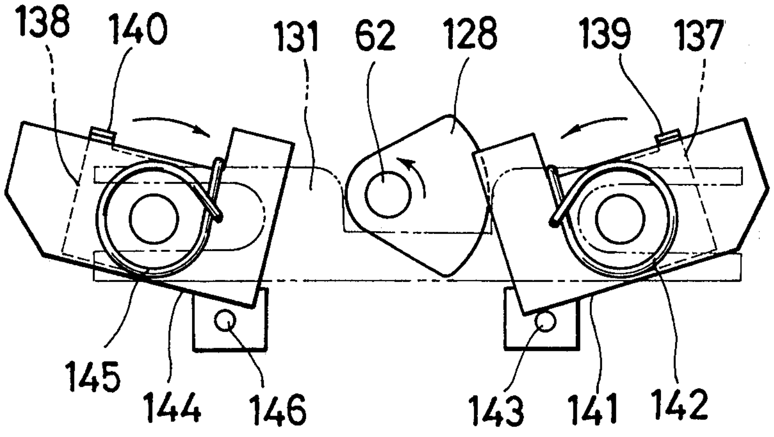
Figure 14:
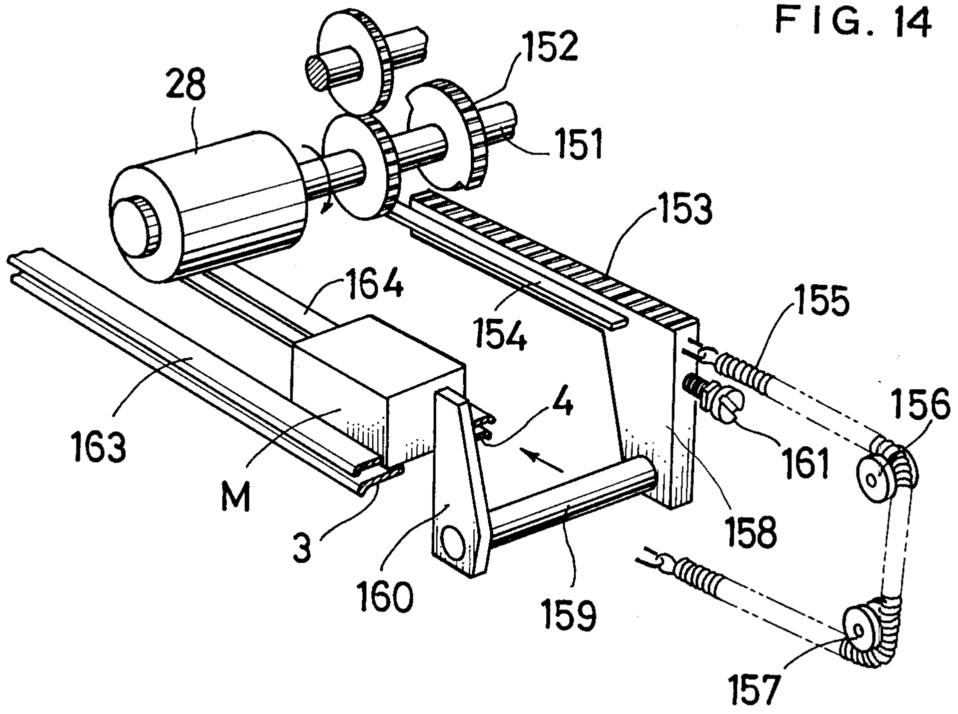
Figure 15:
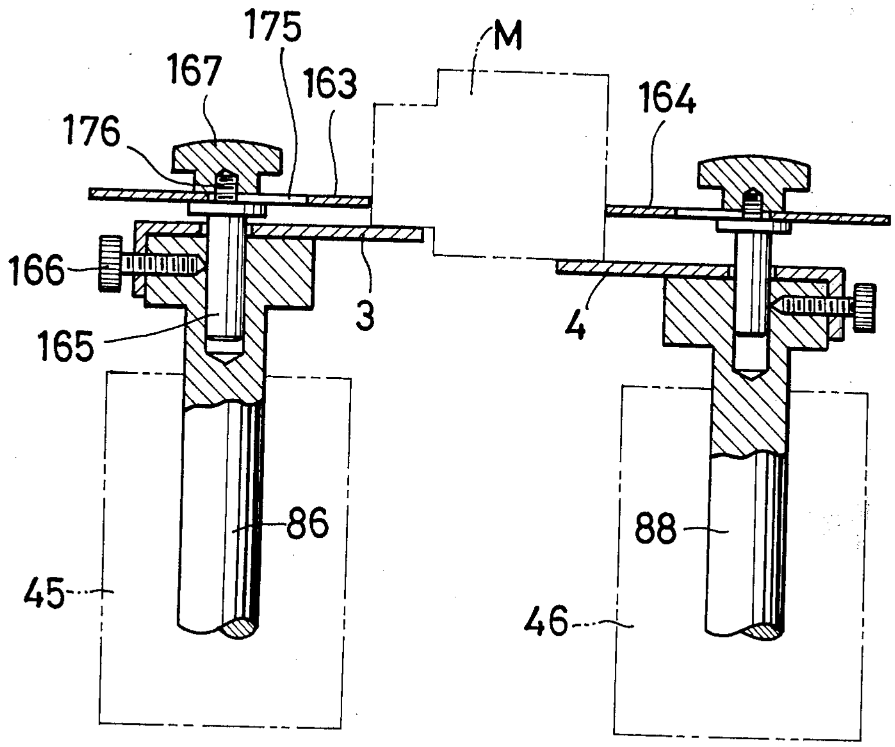

FIG. 13 A, B, C are schematic views for illustrating the actions of the eccentric ink ductor shaft driving means shown in FIGS. 10 to 12;

FIG. 14 is a perspective view of another embodiment of the article conveying means;

FIG. 15 is a sectional view of rods for supporting the rails and guiding members on which an article to which printing is to be applied is conveyed to a printing position; and FIG. 16 is a perspective view of an embodiment of a claw for conveying the article.

Figure 1:
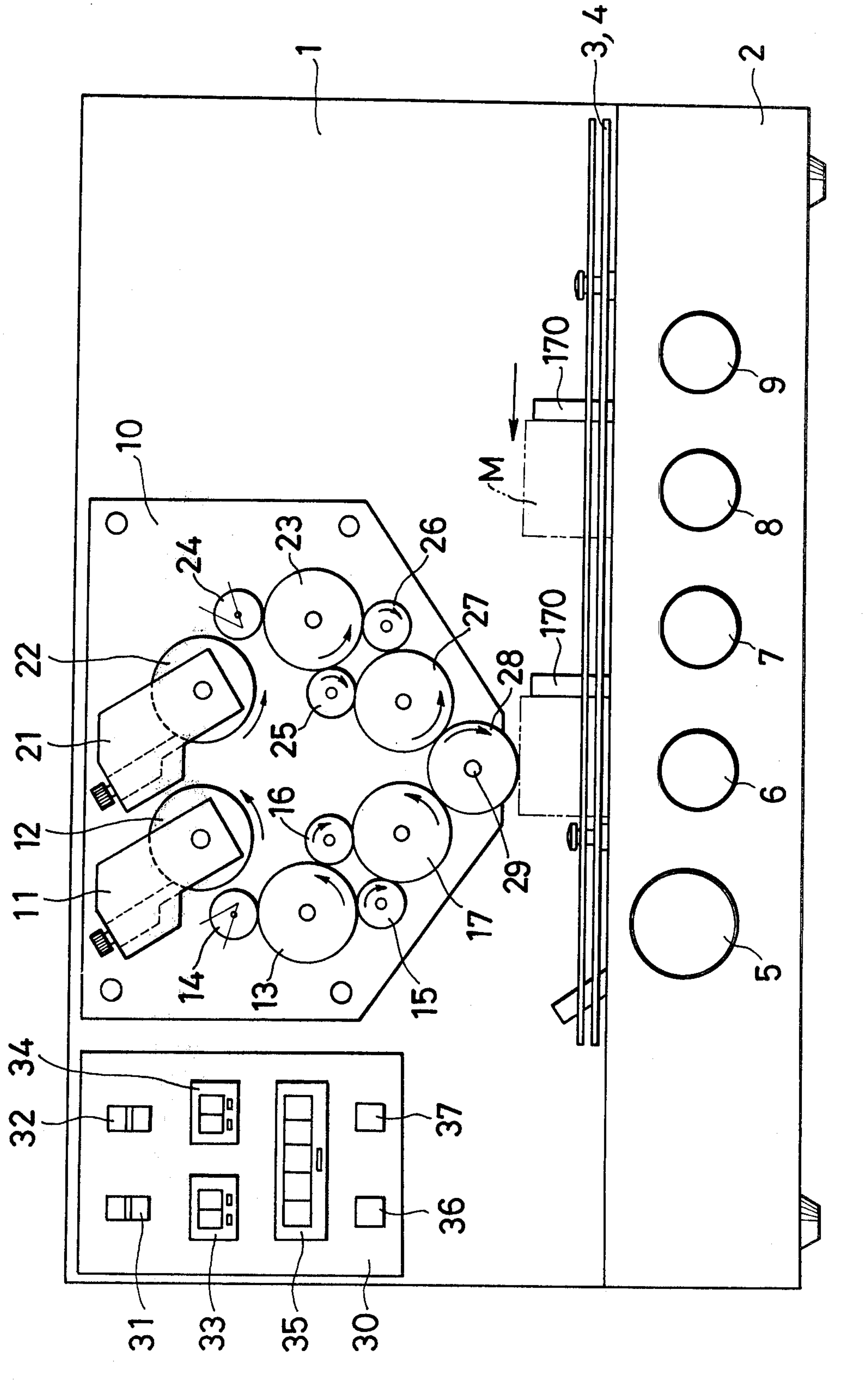
FIG. 1 is a schematic front view illustrating the exterior of an embodiment of a printing machine for three-dimensional articles of small size according to the invention.

Referring first to FIG. 1, there are shown an upper front panel 1 and a lower front panel 2 both for decorative purpose only, an inking arrangement on a frame 10 at the central part of the upper front panel 1, an operation panel 30 attached to the front panel 1 at the left side thereof, an article conveying means behind the lower front panel 2, and a plurality of knobs 5 to 9 for adjusting the conveying means.

The operation panel 30 has thereon an ON-switch 36 for turning on a power supply to the printing machine, an OFF-switch 37 for turning off the power, a counter 35 for counting and displaying the number of printed articles, two electromagnetic counters 33 and 34 for controlling ink ductors independently of each other, and switches 31 and 32 each for switching the modes of ink application to an ink ductor between automatic intermittent application and manual application.

The inking arrangement shown in FIG. 1 is for two-color printing, and thus includes two ink ducts 11 and 21, duct rollers 12 and 22, eccentrically supported ink ductors 14 and 24, ink distributing rollers 13 and 23 with which engage two pairs of intermediate rollers: one pair 15 and 16 and the other 25 and 26, respectively, and plate cylinders 17 and 27. The inking arrangement further includes a blanket cylinder 28 for receiving ink of the the two colors.

Figure 2:
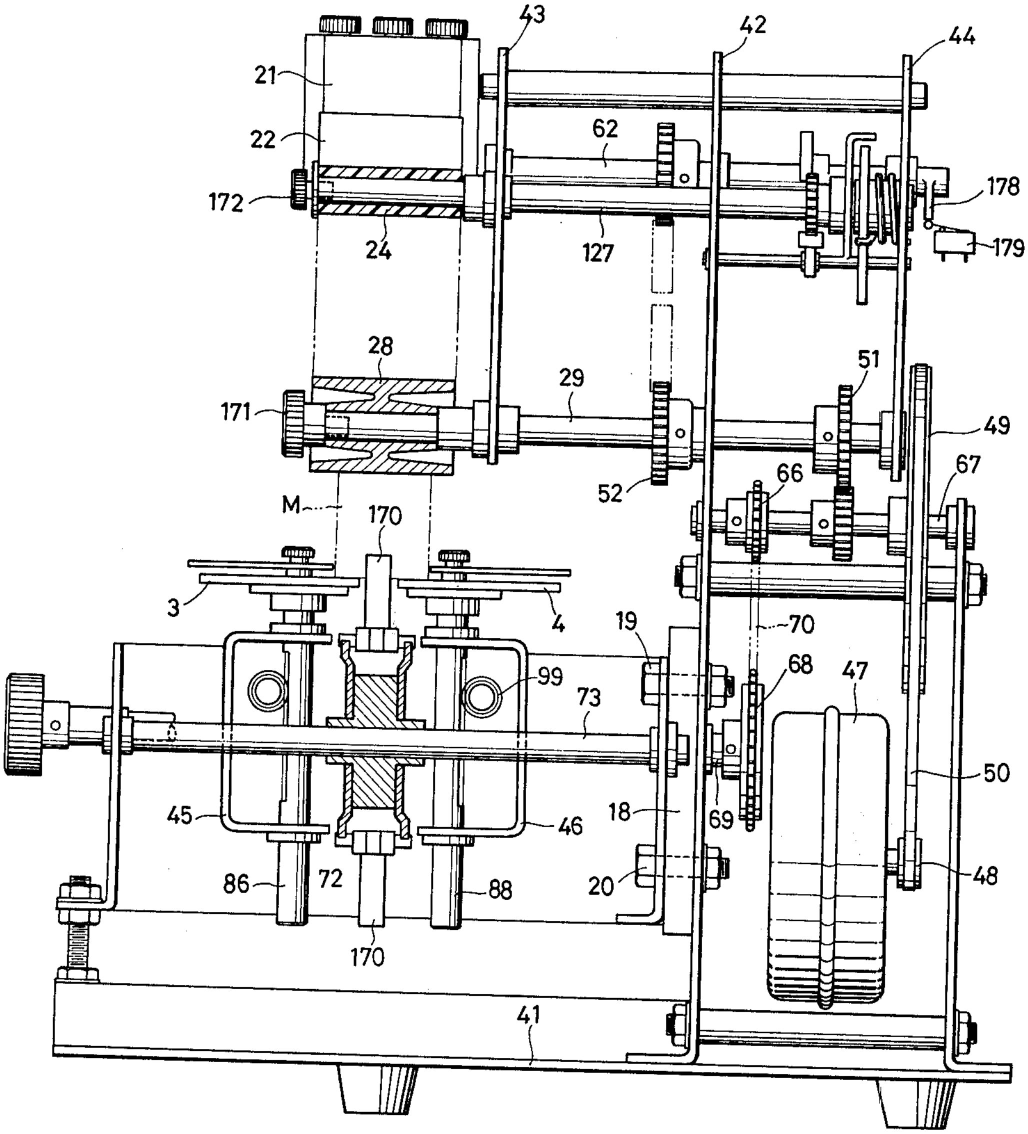
FIG. 2 is a schematic front elevation view showing a gear transmission unit for an inking arrangement, and a belt-chain transmission for an article conveying means included in the printing machine of the invention.
Figure 3:
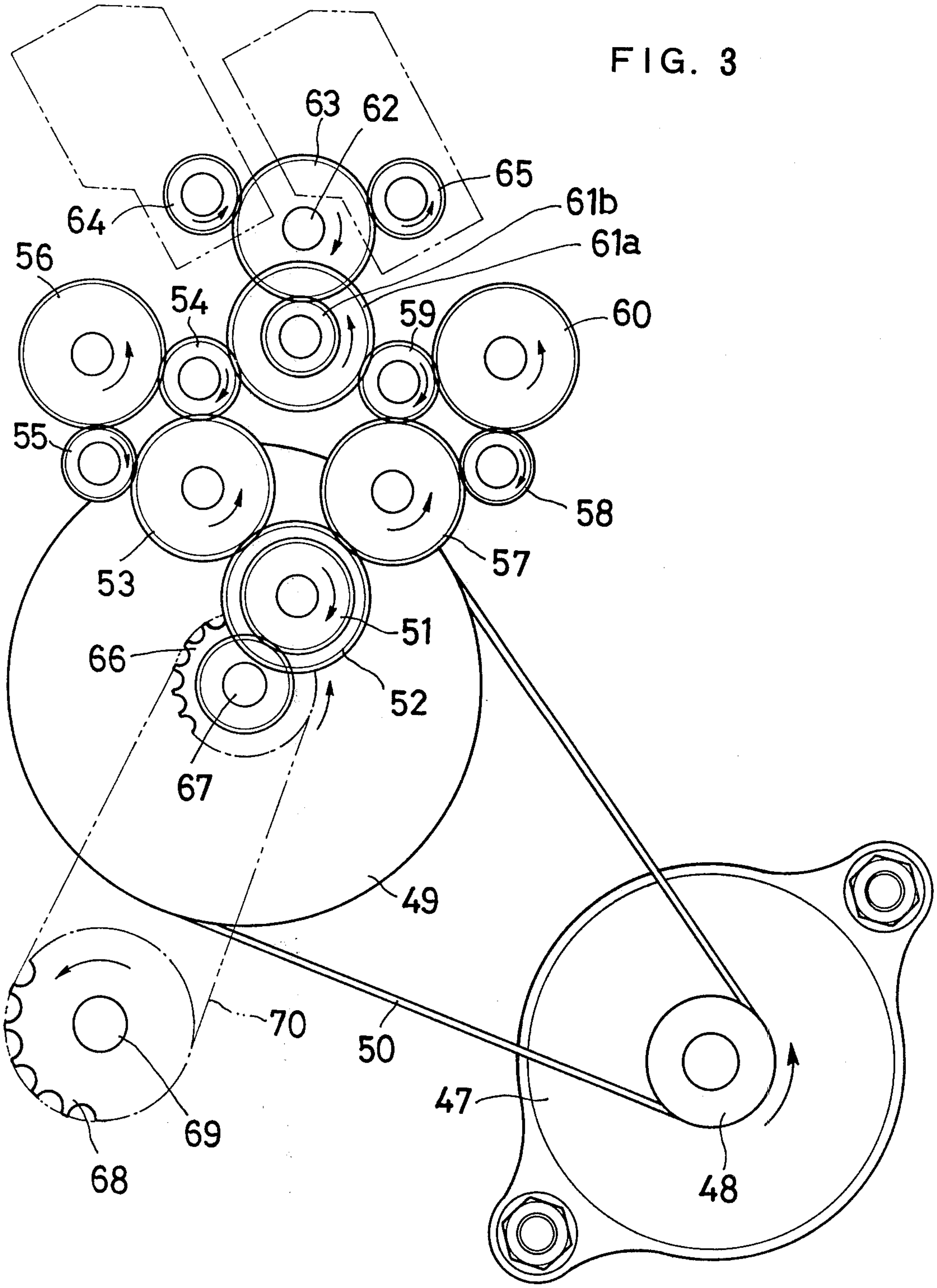
FIG. 3 is a schematic end elevation view of the transmission unit of FIG. 2.

A gear transmission unit for driving the printing rollers is shown in FIGS. 2 and 3.

As shown in FIG. 2, a main frame 42 is fixedly mounted on a base 41 so as to stand erect therefrom between a front frame 43 and a rear frame 44 which are fixedly connected to the main frame 42. An electric motor 47 is mounted on the base 41 for driving the gear transmission unit which is arranged between the main frame 42 and the front frame 43. The electric motor 47 has a rotary shaft driving a pulley 48 fixed thereto. The pulley 48 drives a belt 50 which in turn drives another pulley 49 fixed to a pulley shaft 67. The pulley shaft 67 has a gear fixed thereto which in turn engages with a gear 51 fixedly mounted on a blanket roller shaft 29. The blanket roller shaft 29 has a driving gear 52 for driving the printing rollers involved.

As shown in FIG. 3, the driving gear 52 fixed to the blanket roller shaft 29 engages with plate cylinder shaft gears 53 and 57. The plate cylinder shaft gear 53 engages with a pair of intermediate roller gears 54 and 55 while the plate cylinder shaft gear 57 similarly engages with another pair of intermediate roller shaft gears 58 and 59. In turn, the pair of the intermediate roller shaft gears 54 and 55 engage with an ink distributing roller shaft gear 56, and the other pair of the intermediate roller shaft gears 58 and 59 with an ink distributing roller shaft gear 60.

The intermediate roller shaft gears 54 and 59 engage with a decelerating gear 61*a* having a coaxial gear 61*b* of a smaller diameter than the gear 61*a* fixed thereto. The gear 61*b* engages with a controlling shaft gear 63 fixed to a controlling shaft 62 to drive the duct roller shaft gears 64 and 65. The controlling shaft 62 also controls the movement of the ink ductors 64 and 65 as will be hereinafter described.

Each of the shafts described above is journaled on both the main frame 42 and the fore frame 43, and in some cases also on the rear frame 44. For example, as shown in FIG. 2, the blanket roller shaft 29 is journaled on the three frames 42, 43 and 44, and has the blanket roller 28 on the free end thereof projecting forward from the front frame 43. The printing rollers are preferably detachably fixed to the corresponding roller shafts, as shown for the blanket roller 28 which is detachably fixed on the free end of the blanket roller shaft 29 by means of a screw 171.

As will be understood, the blanket roller shaft gear 52, the plate cylinder shaft gears 53 and 57, the intermediate roller shaft gears 54, 55, 58 and 59, and the ink distributing roller shaft gears 56 and 60 all have the same peripheral surface speed. Each roller carried by the corresponding shaft has a diameter equal to the effective diameter of the corresponding shaft gear so that each roller rotates smoothly in contact with other rollers.

The ink ductors 14 and 24 are eccentrically rotatably supported on the ink ductor shafts, respectively, however. In more detail, referring to FIG. 2, the ink ductor shaft 127 is rotatable to a limited degree in the opposite directions under the control of an eccentric ink ductor driving means. The ink ductor 24 is rotatably supported on the ink ductor shaft 127 so as to be rotatable contact with either the duct roller 22 or the ink distributing roller 23. Preferably, the ink ductor 24 is normally in engagement with the distributing roller 23, and engages with the duct roller 22 for a short time at a predetermined interval only when urged thereagainst by the ink ductor controlling means so that ink is intermittently supplied to the ink distributing roller 23. A preferred embodiment of the eccentric ink ductor controlling means will be described hereinafter in more detail.

Referring to FIGS. 1 and 4, the article conveying unit has a front rail 3 and a rear rail 4 parallel to each other and extending from left to right (in the drawing) in the direction of conveying thereon an article to be printed, and a front guide 163 and a rear guide 164 (FIG. 15) are positioned above the front rail 3 and the rear rail 4, and extending therealong, respectively. The rails support an article to be printed and guide the article therealong in cooperation with the guides. The article is pushed from behind so as to slide forward (to left in the drawings) on the rails 3 and 4 between the guides 163 and 164 by a claw 170 moving forward between the front and the rear rails. The claw 170 has resilient legs of a plastic material, preferably hard polyurethane rubber, as shown in FIG. 16, and is fixed detachably mounted on an endless chain 74 by inserting the legs 75 and 76 into a link of the chain 74. In operation, a plurality of claws 170 are fixed on the chain 74 at intervals therealong so that articles are conveyed to the printing position under the blanket roller 28 synchronously with the rotation thereof.

The chain 74 is driven at the same speed as the peripheral surface speed of the blanket roller 28 by a sprocket wheel 71 mounted on a driving shaft 69 having a sprocket wheel 68 thereon, which engages with a chain 70 meshing with another sprocket wheel 66 mounted on the pulley shaft 67 driven by the electric motor 47 as previously described. The chain 74 also engages around a sprocket wheel 72 freely rotatably mounted on a sprocket wheel shaft 73 so as to form the endless chain. Both the sprocket wheel shafts 69 and 73 are journaled on a rear plate 82 which is in turn fixed to the main frame 42 with spacers 18 therebetween, as shown in FIG. 2.

The rails 3 and 4 are adapted to be vertically movable as well as horizontally slidable so that the surface of an article to be printed accurately comes into contact with the blanket roller 28 when the article passes thereunder and the article is supported and guided so as to be held in a predetermined position in relation to the blanket roller 28 as well.

Figure 5:
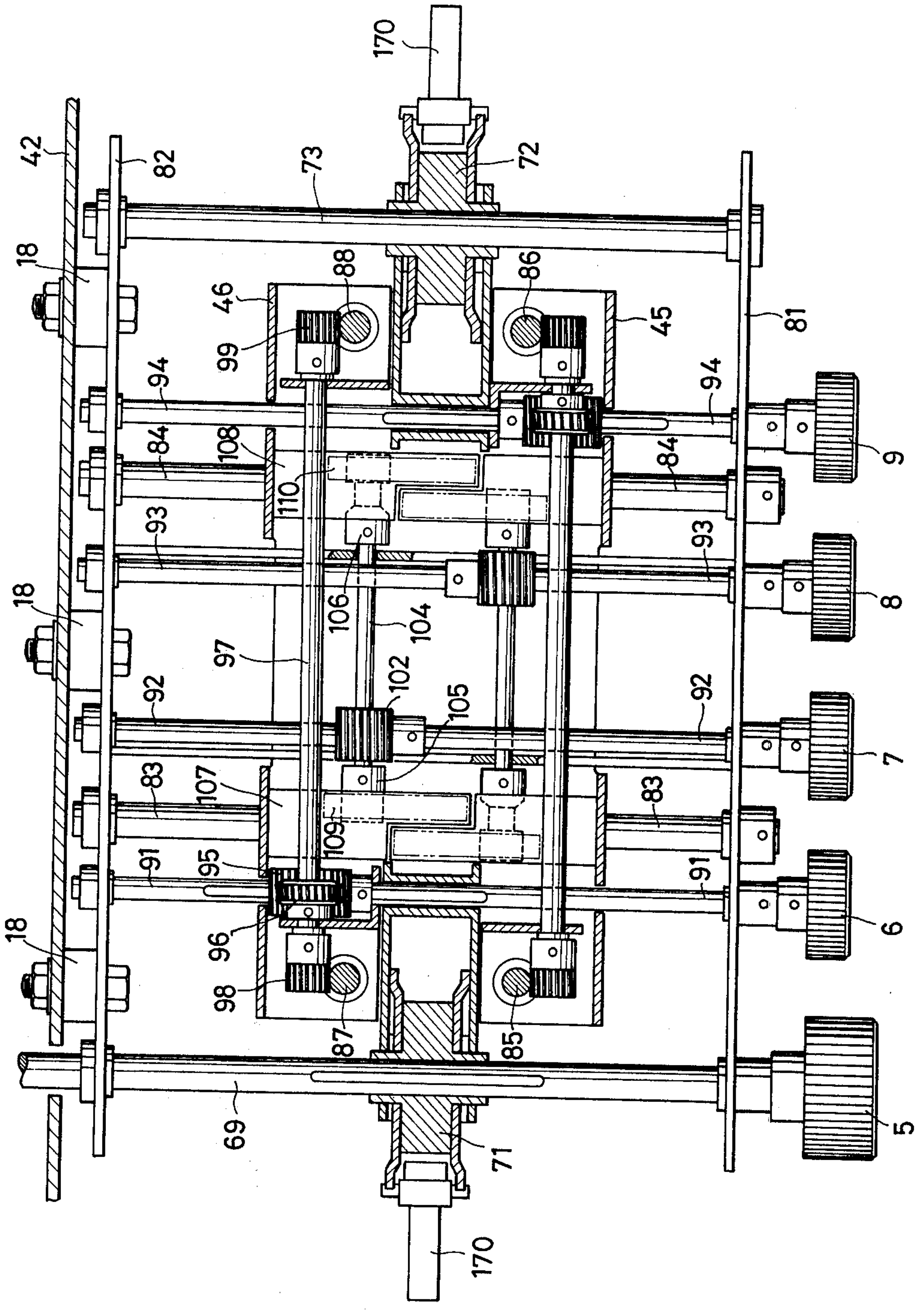
FIG. 5 is a partially sectional plan view of the printing machine of the invention showing in particular an adjusting mechanism for rails included in the article conveying means.
Figure 6:
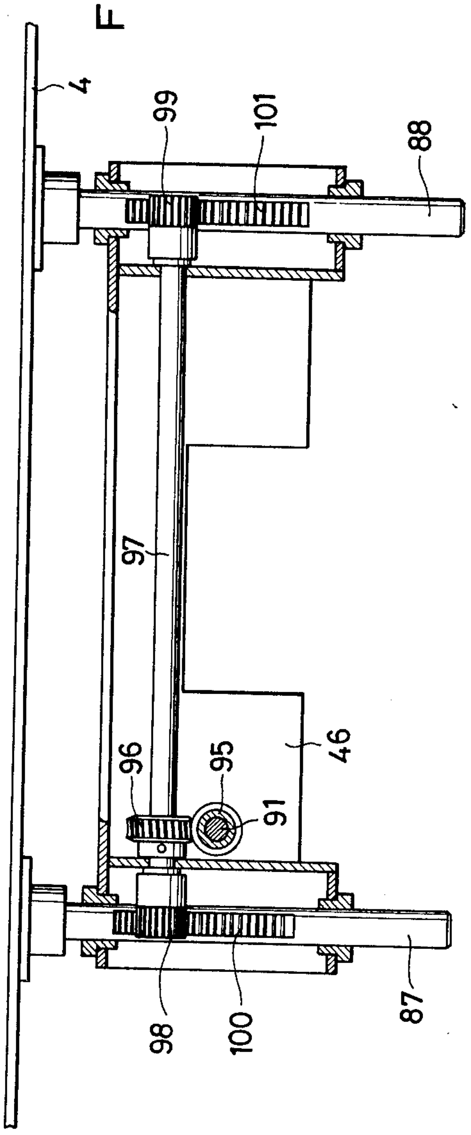
FIG. 6 is a front view of the rail adjusting mechanism for adjusting the rails in the vertical direction.
Figure 7:
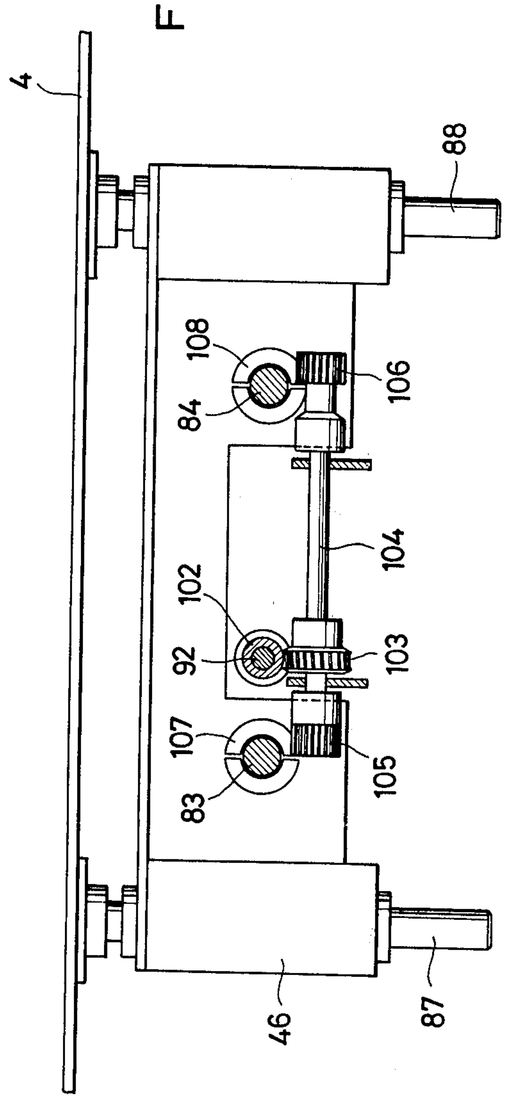
FIG. 7 is a front view of the rail adjusting mechanism for adjusting the rails in the backward and forward direction.

As shown in FIGS. 5, 6, 7 and 15, in particular, in FIGS. 6 and 7, the rear rail 4 is supported on two rods 87 and 88 which are vertically movably mounted on a rear frame 46 with a space therebetween. The rear frame 46 extends in the direction in which articles to be printed are conveyed. The frame 46 is in turn supported on fixed shafts 83 and 84 both interconnecting rigidly a fore plate 81 behind the front panel 2 and a rear plate 82 which is in turn fixedly connected to the main frame 42 with the spacers 18 therebetween. The rear frame 46 is slidable along the fixed shafts 83 and 84. The thus constructed article conveying unit can be detached from the printing machine simply by detaching the rear plate 82 from the main frame 42.

Similarly, the fore rail 3 is mounted on two rail supporting rods 85 and 86 vertically movably mounted on a forward frame 45 at the end portions thereof which are opposed to the rear frame 46. The forward frame 45 is mounted on the fixed shafts 83 and 84 so as to be slidable therealong, that is, in the backward and forward direction in the printing machine.

The adjustment mechanism for the rails 3 and 4 will be now described. For the vertical adjustment of the rails, as seen in FIGS. 5 and 6, the rod 87 has a rack 100 mounted thereon and extending vertically which meshes with a pinion 98 mounted at one end of a horizontally supported shaft 97. At the other end of the shaft 97 is mounted another pinion 99 meshing with a rack 101 mounted on the other rod 88. The shaft 97 has a worm gear 96 mounted thereon which in turn meshes with a worm 95 mounted on a rotary shaft 91 having at its free end or the fore end a knob 6 fixed thereto so that when the knob 6 is turned, the worm 95 is rotated together with the rotary shaft 91, causing the worm gear 96 to rotate the pinions 98 and 99 meshing with the racks 100 and 101, respectively, whereby the rods 87 and 88 elevate with the rear rail 4. The fore rail 3 is also by a knob 9 in the same manner as above as will be readily understood from FIG. 5. Thus a detailed explanation is omitted.

The horizontal adjustment mechanism is shown in FIGS. 5 and 7. As previously described, the rods 87 and 88 support the rear rail 4 and are mounted on the rear frame 46 which is slidable along the fixed shafts 83 and 84, which extend between the fore plate 81 and the rear plate 82. The rear frame 46 has a sleeve 107 fixed thereto which is slidable along the fixed shaft 83 extending therethrough. The sleeve 107 has a rack 109 on the underside thereof which in turn mates with a pinion 105 mounted on one end of a horizontal shaft 104 having at the other end another pinion 106 mating with a rack 110 mounted on a sleeve 108 slidable along the fixed shaft 84 extending therethrough. A worm gear 103 is mounted on the shaft 104. The worm gear 103 mates with a worm 102 mounted on a rotary shaft 92 which has at its free end a knob 7 fixed thereto. Thus, when the knob 7 is rotated together with the shaft 92 and the worm 102 meshes with the worm gear 103, the shaft 104 is forced to rotate the pinions 105 and 106 mounted on both the ends. Since the pinions engage with the racks 109 and 110 on the sleeves 107 and 108, respectively, the sleeves move forward or backward with the rear frame 46.

The fore rail 3 is also adjustable by a knob 8 in the same manner as above, and the explanation thereof is omitted.

FIG. 15 shows the guides 163 and 164. The fore guide 163 has a plurality of holes 175 corresponding to the rail supporting rods 86, and is fixed between a fixing member 167 and a support 165 inserted into the rod 86 with an upper screw portion 176 screwed into the fixing member. The holes are designed to have a relatively large area in relation to the sectional area of the screw portion of the support so that the guide is slidable on the support and can be fixed at the desired position relative to an article guided thereby. A plurality of the holes 175 can be replaced with a longitudinally extending slit having a relatively wide width in relation to the diameter of the screw portion 176 of the support 165.

Figure 8:
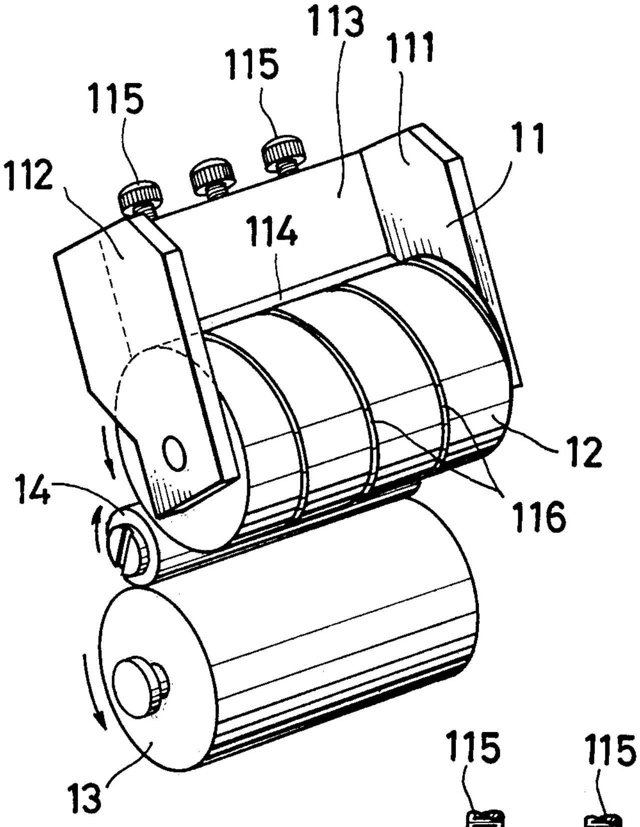
FIG. 8 is a perspective view of an ink duct including in the inking arrangement of the printing machine of the invention.
Figure 9:
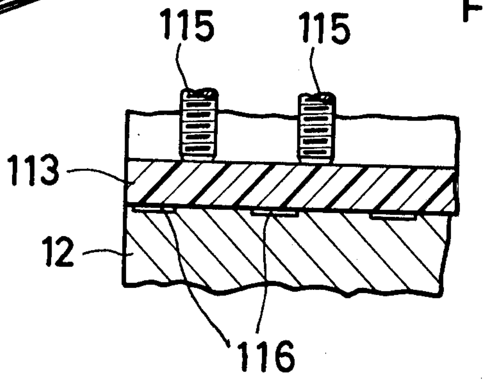
FIG. 9 is an enlarged sectional view of an ink duct blade and a duct roller.

In to the inking arrangement, there is shown in detail in FIGS. 8 and 9 a preferred embodiment of the ink duct 11 comprising a pair of walls 111 and 112, the duct roller 12 rotatably supported between the walls, and a resilient ink duct blade 113 space from with the duct roller 12 to define a small gap 114 therebetween from which a small amount of ink is taken out to supply to the eccentric ink ductor 14 when it is forced into contact with the duct roller 12 in the manner as described previously.

The blade 113 is made of a resilient plastic material such as hard polyurethane rubber so that the gap between the lower edge and the duct roller 12 is adjustable by adjusting screws 115 which are arranged with their ends abutting the lower edge of the blade 113. As is shown in FIG. 9, when the screws 115 are moved downwardly the gap becomes smaller whereas when the screws are retracted, the gap becomes wider.

The duct roller 12 preferably has a plurality of annular channels or a spiral channel 116 of a very small depth, about two hundredths mm or less, and, a relatively large width of about 1 mm or more, on the surface thereof. By the duct roller as described above, a trace amount of ink 114 can be readily and smoothly taken out of the ink duct 11. Furthermore, the amount of ink 114 taken out through the channel 116 can be increased or reduced by an extremely small amount since when the blade 113 is pressed against the duct roller 12, the face thereof in contact with the duct roller 12 will be depressed into the channel 116, thereby reducing the cross-sectional area of the channel.

The inking arrangement shown in FIG. 1 is for two-color printing, and has, therefore, two ink ductors 14 and 24 forced into contact with the duct rollers 12 and 22 in an intermittent manner, respectively. The two ink ductors 14 and 24 are preferably controlled by individual controlling means independently of each other, since the amount of ink of one color is in general different from that of another color depending upon the area of the pattern on the plate or block to which the ink is to be applied. Therefore, means are provided for controlling one of the ink ductors independently of the others although it is applicable for controlling all the controlling shafts at the same time in common.

A pulse generator is associated with any one of the printing roller shafts, for example, with the shaft 62 carrying the gear 63 meshing with the duct roller shaft gears 64 and 65 (FIG. 3) so as to produce a pulse signal at every predetermined number of turns of the shaft 62. The pulse generator may be electrically connected with a clock device so as to produce a pulse signal at predetermined intervals. The pulse is sent to a preset counter 33 and 34 (FIG. 1) where the number of the pulses received is counted. When the number of the pulses has reached the predetermined number which set in advance through the electromagnetic counter 33 and 34, it is displated on the electromagnetic counter 33 and 34, and a driving signal is produced. The driving signal actuates the magnet 143 or 146, which shifts the ink ductor 14 or 24.

The ink ductor driving means or the ink ductor controlling means can be various mechanisms since the means is required only to shaft the ink ductor shaft along an arc to a limited degree in a fixed direction in response to the controlling signal from the counter 33 or 34.

Prior to referring to FIGS. 10 to 13, however, as shown in FIG. 2, the driving shaft 62 has a cam or projection 178 mounted thereon so that every turn of the shaft 62 forces the cam 178 to activate a switch device 179. The switch device 179 is electrically connected with preset counter 33 and 34 where the number of the shaft rotations is counted to produce the pulse signal.

As is shown in FIG. 10, the shaft 62 has another plate cam 128 mounted thereon so as to be rotatable therewith. The plate cam 128 engages with a cam follower 130 in the form of a roller rotatably supported on a sliding member 131 which is in turn supported on rollers 132 so as to slide in opposite directions or reciprocate on the rollers 132 in response to the engagement of the plate cam 128 with the cam follower 130. The sliding or reciprocating member 131 is provided with a rack 133 which meshes with a gear 135 mounted coaxially with the ink ductor shaft 127 so as to be rotatable independently thereof. The gear 135 has a first rotary member 137 fixed thereon so as to be rotatable therewith. On the other hand, the ink ductor shaft 127 has a second rotary member 141 fixed thereon so as to be rotatable therewith in coaxial relation to the first rotary member 137.

The second rotary member 141 is urged to rotate in one direction as shown by the arrow in FIG. 10 by a spiral spring 142 or the like supported by the rear frame 44 (as shown in FIG. 2). However, the first rotary member 137 has a stop 139 projecting therefrom to prevent the rotation of the second rotary member 141 in the one direction due to the spring 142 by the abuttment of the stop 139 against a side of the second rotary member 141.

As is apparent from the foregoing description, the rotation of the shaft 62 causes the sliding member 131 to reciprocate on the rollers 132 through the engagement of the cam 128 on the shaft 62 with the cam follower 130 on the sliding member 131, while the gear 135 meshing with the rack 133 on the sliding member 131 rotates clockwise and counterclockwise alternately through a limited arc.

In an area which is covered by the second rotary member 141 when it makes a turn past the limited arc, is provided a moving-iron type electromagnet 143 which is energized upon receipt of a controlling signal from one of the counters to pull the iron core into the electromagnet 143. The iron core 180, however, projects from the electromagnet 143 when the magnet is not energized to limit the rotation of the second rotary member 141 due to the abuttment of the projecting iron core 180 by a a side of the second rotary member when the gear 135 rotates counterclockwise with the first rotary member 137, as is illustrated in FIG. 10.

FIGS. 11 and 12 show a device similar to the above for controlling two ink ductors independently of each other, and comprises a pair of device like the device shown in FIG. 10 symmetrically arranged. The cam 128 mounted on the driving shaft 62 engages with two cam followers 129 and 130 which are rotatably mounted at the central portion of the sliding member 131 having two racks 133 and 134 on both sides thereof. The racks mate with the gears 135 and 136, respectively, and each gear is mounted on the individual ink ductor shaft so as to be rotatable independently thereof, as was previously described. Each ink ductor shaft has the second rotary member which is urged to rotate in one direction by means of the spring in the same manner as is shown in FIG. 12. The first rotary members 137 and 138 have the stops 139 and 140, respectively, and the stops prevent the rotation of the second rotary members 141 and 144, respectively, also in the same manner as above.

Figure 13A:
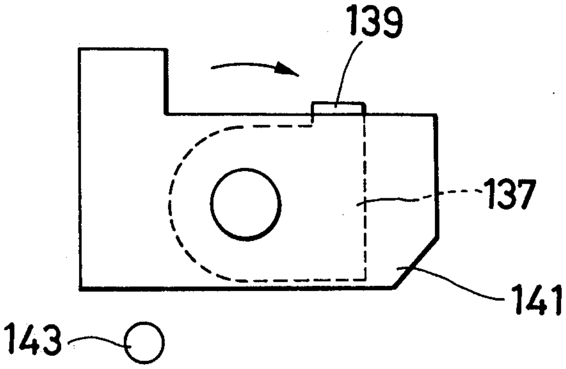
Figure 13B:
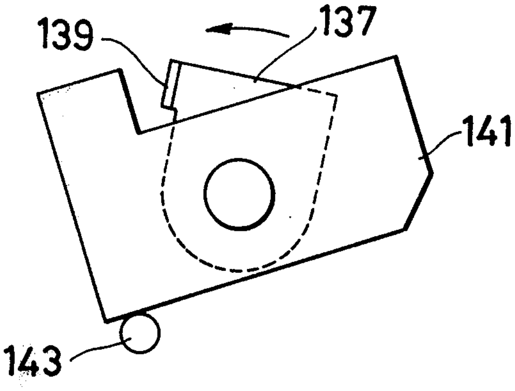

FIG. 13 shows the actions of the mechanism of the device shown in FIG. 10. As is shown in FIG. 13A, during each half cycle of the clockwise rotation of the first rotary member 137 to a limited degree, the stop 139 of the member forces the second rotary member 141 to rotate clockwise with the first rotary member 137 against the urging force of the spring. During each half cycle of the counterclockwise rotation of the first rotary member to a limited degree, the second rotary member 141 also rotates counterclockwise since it is urged to rotate in that direction, but further counterclockwise rotation is not permitted by the abuttment of the projecting iron core 143 (180 in FIG. 10) by a side of the second rotary member, as is shown in FIG. 13B.

Figure 13C:
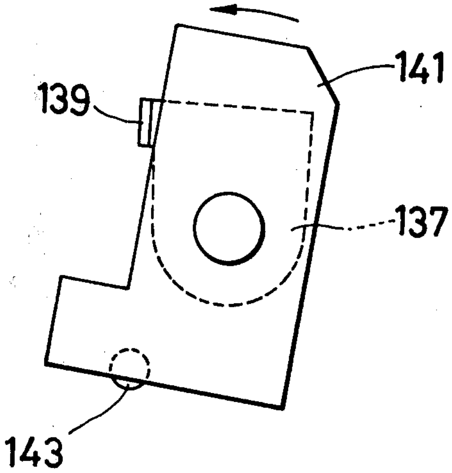

However, when the electromagnet is energized to pull the iron core into the electromagnet coil, the second rotary member 141 is freed to rotate further counterclockwise, and passes the iron core. That is, the second rotary member rotates counterclockwise through a limited arc, as is shown in FIG. 13C. The second rotary member 141 then stops due to the engagement of the stop 139 by the second rotary member, also shown in FIG. 13C.

When the first rotary member 137 again makes a clockwise rotation to the limited degree as is shown in FIG. 13A, the second rotary member 141 is forced to rotate clockwise and return to its original position by the engagement of the stop 139 with the second rotary member 141, with the iron core simultaneously being pushed out of the electromagnet coil, again ready to prevent further counterclockwise rotation of the second rotary member.

The rotation of the second rotary member 141 beyond the limited degree only causes the ink ductor 14 to contact the duct roller 12 until the second rotary member 141 returns to its original position. However, while the second rotary member 141 rotates clockwise and counterclockwise alternately within the limited arc, the ink ductor shaft does not through an arc large enough to cause the ink ductor eccentrically mounted on the ink ductor shaft 127 to contact with the duct roller.

FIG. 14 illustrates another embodiment of the article conveying means of the invention. In this embodiment, a blanket cylinder shaft 151 (corresponding to the blanket cylinder shaft 29 in FIG. 2) has a half gear 152 which is provided with teeth only on half the periphery thereof. The half gear 152 meshes with a rack 153 mounted on a reciprocating member 158 to drive the member forward along a guide 154, i.e., in the direction an article to be printed is conveyed to a predetermined printing position. The article is supported on the rails 3 and 4 and conveyed along the guides 163 and 164. The reciprocating member 158 is connected to a spring 155 so as to be pulled to its original position when the engagement of the half gear 152 with the rack 153 is ended. The original position of the reciprocating member is adjustable by means of an adequate stop 161.

The spring 155 is preferably a long one as is shown in FIG. 14 and has of a small modulus of elasticity so that its tensile force does not greatly increase during the long stroke of the reciprocating member. This long spring is preferably supported on rollers 156 and 157 so as to be contained in a limited space within the printing machine.

The reciprocating member 158 further has an arm extending downward therefrom supporting a projection 159 rigidly thereon which in turn has a claw 160 connected thereto so as to be movable with the reciprocating member 158.

Thus, when the half gear 152 meshes with the rack 153 to drive the reciprocating member 158 forward, the claw 160 moves forward therewith between the rails 3 and 4, thereby conveying the article to the printing position under the blanket roller 28.

As is previously noted, an article to be printed should be conveyed to the printing position at the same speed as the peripheral surface speed of the blanket roller 28 as well as in synchronization with the rotation of the blanket roller so that when the article comes under the blanket roller 28, an inked pattern on the blanket roller received from the plate cylinder makes contact with the predetermined portion of the surface of the article, thereby printing the pattern on the article.

Therefore, in this embodiment of the article conveying unit, the forward stroke of the reciprocating member 158 is synchronized with the rotation of the blanket roller 28 and member 158 is driven at the same speed as the peripheral surface speed of the blanket roller.

After printing, the half gear 152 disengages from the rack 153, and the reciprocating member 158 is returned to the original position by the spring 155.

The position of the guides 163 and 164 is selected or adjusted according to the shape and the size of the article M to be conveyed therealong. For example, the support 165 is inserted halfway into the rod 86 and is fixed thereto with a screw 166 so that the support 165 supports the guide at a position corresponding to the article, as is shown in FIG. 15.

The knobs 6 to 9 are preferably arranged in a line on the lower front panel 2 so that the printing machine has a good appearance, as is shown in FIG. 1.

The embodiments as above described as directed to an offset printing press, but it is to be understood that the invention can be applied to a gravure-offset printing press and a typographic printing press.

What is claimed is:

1. A printing machine for printing on a three-dimensional article, comprising:

an inking means having a printing roller for printing on the article, and means associated with said printing roller for supplying printing ink to said roller, for distributing the ink on said roller and for controlling the amount of ink on said roller;

a guiding means having elongated members for slidably supporting an article to be printed for guiding the article along a path beneath said printing roller in a position for the article to be printed on by said printing roller, said guiding means having a pair of rails parallel to each other and a pair of guides above said rails and parallel to each other and extending along the respective rails, rods on which the respective rails are mounted for supporting the rails, separate frames on which the rods of the respective rails are respectively vertically movably mounted, two rotatable shafts connected to said rods for driving said rods in the vertical direction by rotation of said two shafts for vertically adjusting said rails, fixed shafts supporting said frames for horizontal movement in the direction transversely of the rails, two further rotatable shafts connected to said frames for moving said frames along said fixed shafts by the rotation of said two further shafts for horizontally adjusting said rails, and a knob fixed to each of the four rotatable shafts at one end thereof and arranged in a line on the front of the printing machine; and a pushing means between said rails for sliding the article to be printed forward on and along said rails, said pushing means including means for driving said pushing means forward at the same speed as the peripheral surface speed of said printing roller in synchronization with the rotation of said printing roller.

2. A printing machine for printing on a three-dimensional article, comprising:

an inking means having: a printing roller for printing on the article; at least one distributing roller operatively associated with said printing roller for distributing ink thereto; at least one duct roller spaced from said ink distributing roller and having at least one channel having a small width and depth relative to the diameter of said duct roller around the peripheral surface thereof; at least one ink ductor shaft between said duct roller and said distributing roller; at least one ink ductor eccentrically rotatably mounted on said ink ductor shaft normally in contact with one of said duct roller and the ink distributing roller and movable by the rotation of said ductor shaft to a position in contact with the other roller; an ink ductor controlling means connected to said ink ductor shaft for causing the ink ductor shaft to rotate reciprocally for moving said ink ductor between the two positions, said ink ductor controlling means having a first rotary member supported coaxially with the ink ductor shaft and rotatable clockwise and counterclockwise a limited amount independently of said ink ductor shaft, a second rotary member mounted on said ink ductor shaft and rotatable therewith and having means engaged therewith urging said second rotary member to rotate in one direction to move said ink ductor into contact with said ink roller, a stop mounted on said first rotary member and engaged by said second rotary member to rotate said first rotary member in the one direction and which forces said second rotary member to rotate with said first rotary member in the other direction, an electromagnet having an iron core movable into and out of said core and which projects into the path of rotation of the second rotary member when it is rotating in the one direction to less than the limited amount of motion when the electromagnet is not energized, means to energize the electromagnet to retract said iron core from the path of rotation of the second rotary member to permit said second rotary member to rotate to the complete limited amount of motion, a driving shaft for driving the ink ductor shaft, a plate cam on said driving shaft, a reciprocally slidable sliding member having a rack thereon, a cam follower on said sliding member and engaged with said plate cam, said sliding member being reciprocated by said plate cam when the driving shaft rotates, and a gear fixed to said first rotary member coaxially with said second rotary member and engaged by said rack for rotating said first rotary member in the clockwise and counterclockwise directions to the limited amount; an ink duct blade movable for bringing the lower edge thereof into contact with said duct roller for controlling the amount of ink on said duct roller, and means for supplying printing ink to said ink duct blade;

a guiding means having elongated members for slidably supporting an article to be printed for guiding the article along a path beneath said printing roller in a position for the article to be printed on by said printing roller, said members being horizontally and vertically movable for adjustment for accommodating different size articles; and a pushing means associated with said guiding means for sliding the article to be printed forward on and along said guiding means, said pushing means including means for driving said pushing means forward at the same speed as the peripheral surface speed of said printing roller in synchronization with the rotation of said printing roller.

3. A printing machine as claimed in claim 2 in which there are two ink ductors, and said ink ductor controlling means includes a further first rotary member, second rotary member, stop, electromagnet and further gear for the second ink ductor, and said reciprocally sliding member having a further rack thereon engaged with said further gear for said second ink ductor and having a further cam follower thereon engaged with said plate cam, whereby said reciprocally sliding member is reciprocated by said cam for controlling both said ink ductors.

* * * * *